(12) United States Patent
Sugaya

(10) Patent No.: US 9,658,817 B2
(45) Date of Patent: May 23, 2017

(54) SCREEN SHARING TERMINAL, METHOD OF SCREEN SHARING, AND PROGRAM FOR SCREEN SHARING TERMINAL

(71) Applicant: OPTiM Corporation, Saga-shi, Saga (JP)

(72) Inventor: Shunji Sugaya, Tokyo (JP)

(73) Assignee: OPTiM Corporation, Saga-shi (JP)

( * ) Notice: Subject to any disclaimer, the term of this patent is extended or adjusted under 35 U.S.C. 154(b) by 0 days.

(21) Appl. No.: 14/884,403

(22) Filed: Oct. 15, 2015

(65) Prior Publication Data

US 2017/0109117 A1    Apr. 20, 2017

(51) Int. Cl.
| | |
|---|---|
| H04M 1/66 | (2006.01) |
| H04M 1/68 | (2006.01) |
| H04M 3/16 | (2006.01) |
| G06F 3/14 | (2006.01) |
| G06F 3/0482 | (2013.01) |
| H04W 12/06 | (2009.01) |
| H04M 1/725 | (2006.01) |

(52) U.S. Cl.
CPC .......... *G06F 3/1454* (2013.01); *G06F 3/0482* (2013.01); *H04M 1/72527* (2013.01); *H04W 12/06* (2013.01)

(58) Field of Classification Search
CPC  G06F 3/1454; G06F 3/0482; H04M 1/72527; H04W 12/06
USPC ........................................................ 455/411
See application file for complete search history.

(56) References Cited

U.S. PATENT DOCUMENTS

| | | | | |
|---|---|---|---|---|
| 8,613,070 | B1* | 12/2013 | Borzycki | G06F 21/6218 726/8 |
| 8,744,956 | B1* | 6/2014 | DiChiara | H04L 63/126 705/35 |
| 9,213,850 | B2* | 12/2015 | Barton | G06F 21/604 |
| 2014/0337528 | A1* | 11/2014 | Barton | H04L 63/10 709/225 |
| 2015/0149916 | A1* | 5/2015 | Mendez | G06F 17/30873 715/738 |
| 2015/0264180 | A1* | 9/2015 | Wolthuis | H04M 3/5233 379/265.12 |
| 2015/0271331 | A1* | 9/2015 | Segre | H04M 3/5232 379/265.09 |
| 2015/0373123 | A1* | 12/2015 | Warrick | H04L 67/141 709/228 |
| 2016/0112521 | A1* | 4/2016 | Lawson | H04L 67/16 709/227 |

* cited by examiner

*Primary Examiner* — Marceau Milord
(74) *Attorney, Agent, or Firm* — KMF Patent Services, PLLC; S. Peter Konzel; Kenneth M. Fagin

(57) ABSTRACT

The present invention is to provide a screen sharing terminal which easily authenticates and identifies the other terminals to share the screen, and enables to share a screen with the identified terminals and devices communicatively connected to the identified terminals. Between the screen sharing terminal and the communication terminal that share the screen, the terminals are easily identified by the authentication which is initiated by outgoing and incoming phone call between the terminals through the telephone network. In addition, the screen sharing can be done with the electronic devices communicatively connected to the communication terminal by transmitting the received screen data to the communication terminal.

6 Claims, 7 Drawing Sheets

SCREEN SHARING TERMINAL, METHOD OF SCREEN SHARING, AND PROGRAM FOR SCREEN SHARING TERMINAL

TECHNICAL FIELD

The present invention relates to a screen sharing terminal, a method of screen sharing, and a program for screen sharing terminal to share the screen with other terminals.

BACKGROUND ART

In recent years, various services have been provided for users by connecting portable terminals with a web servers and the like through a public line network. In particular with the appearance of smartphones (mobile phones with advanced functions), it becomes possible to provide advanced services which were conventionally provided by the personal computers using mobile phones.

Besides the services provided by the servers, various functions are installed in smartphones. However, it often takes time for users to become familiar with all the functions provided by smartphones. For example, even if smartphones have many functions which are requested by the users, there is a problem that the users cannot utilize these functions because the way to setup the functions is unknown.

In order to maximize the usage of advanced web services and advanced functions of smartphones, users need to know the setup operations and the functions of smartphones. Moreover if a user, who is not familiar with the setup operations of the user's terminal, tries to setup the terminal for the first time, the user may delete the setup information that should not be deleted or may end up in the error state because of the inappropriate configurations.

For approaching such problems, a method is disclosed for remotely support (remote maintenance) the user's terminals from the remote systems to configure the user's terminals and to instruct the users of the terminal. For example, Patent Document 1 discloses a server acquiring the screen information of the client to be supported and continuously displaying the screen information on the server to improve the efficiency of both support and monitoring of the client.

CITATION LIST

Patent Literature

Patent Document 1: JP 2003-6062A

SUMMARY OF INVENTION

However, in the technique disclosed in Patent Document 1, it is necessary to know IP address beforehand to make a connection between the client and the server. Moreover, in recent years, besides the companies providing remote supports, the scenes are increased where remote support and screen sharing are executed between users, and conventional techniques accessing to a predetermined domain or predetermined IP address are not sufficient anymore. There is an urgent need to easily identify the terminals for connecting to share a screen.

The present invention is made in consideration of this problem to provide with a screen sharing terminal, a method of screen sharing, and a program for screen sharing terminal to share a screen with other electronic devices which are communicatively connected to the terminal by easily identifying the terminals using the authentication which is initiated by outgoing and incoming phone call between the terminals that share a screen and by relaying the received screen data.

According to the first aspect of the present invention, a screen sharing terminal communicatively connected to one or more communication terminals, for sharing a screen with the communication terminals, includes:

an authentication unit authenticating a communication terminal to establish communication for sharing a screen with the communication terminal;

an electronic device list acquiring unit acquiring the list of electronic devices owned by the user of the communication terminal and communicatively connected to the communication terminal;

a screen sharing terminal selecting unit accepting the selection of a terminal or an electronic device with which a screen is shared from the acquired list of the communication terminal and the electronic devices; and a screen sharing initiating unit initiating a screen to be shared with the communication terminal or the electronic device accepted in the selection through the established communication.

According to the first aspect of the present invention, a screen sharing terminal communicatively connected to one or more communication terminals, for sharing a screen with the communication terminals, authenticates the communication terminal to establish communication for sharing a screen with the communication terminal, acquires the list of electronic devices owned by the user of the communication terminal and communicatively connected to the communication terminal, accepts the selection of a terminal or an electronic device with which a screen is shared from the acquired list of the communication terminal and the electronic devices, and initiated a screen to be shared with the communication terminal or the electronic device accepted in the selection through the established communication.

The first aspect of the present invention is the category of screen sharing terminal, but the categories of a method for sharing screen and a program for screen sharing terminal have similar functions and effects.

According to the second aspect of the present invention, the screen sharing terminal according to the first aspect of the present invention further includes a sharing status notifying unit notifying the sharing status of the screen to be shared by voice.

According to the second aspect of the present invention, in the screen sharing terminal according to the first aspect of the present invention, the screen sharing terminal notifies the sharing status of the screen to be shared by voice.

According to the third aspect of the present invention, the screen sharing terminal according to the first or second aspect of the present invention, wherein the authentication unit authenticates a communication terminal by a user identified by the phone number of outgoing phone call, and the screen sharing initiating unit transmits a screen of the screen sharing terminal to the communication terminal or the electronic device.

According to the third aspect of the present invention, in the screen sharing terminal according to the first or second aspect of the present invention, the screen sharing terminal authenticates a communication terminal by a user identified by the phone number of outgoing phone call, and transmits a screen of the screen sharing terminal to the communication terminal or the electronic device.

According to fourth aspect of the present invention, a method of screen sharing executed by the screen sharing terminal, communicatively connected to one or more communication terminals, for sharing a screen with the communication terminals, includes the steps of:

authenticating a communication terminal to establish communication for sharing a screen with the communication terminal;

acquiring the list of electronic devices owned by the user of the communication terminal and communicatively connected to the communication terminal;

accepting the selection of a terminal or an electronic device with which a screen is shared from the acquired list of the communication terminal and the electronic devices; and initiating a screen to be shared with the communication terminal or the electronic device accepted in the selection through the established communication.

According to the fifth aspect of the present invention, a program product for use in a screen sharing terminal communicatively connected to one or more communication terminals, for sharing a screen with the communication terminals, includes a non-transitory computer usable medium having a set of instructions physically embodied therein, the set of instructions including computer readable code, which when executed by the affiliate server causes the information processing unit to:

authenticate a communication terminal to establish communication for sharing a screen with the communication terminal;

acquire the list of electronic devices owned by the user of the communication terminal and communicatively connected to the communication terminal;

accept the selection of a communication terminal or a electronic device with which a screen is shared from the acquired list of the communication terminal and the electronic devices; and initiate a screen to be shared with the communication terminal or the electronic device accepted in the selection through the established communication.

According to the present invention, the terminals are easily identified by the authentication which is initiated by outgoing and incoming phone call between the terminals that share the screen. In addition, the screen sharing can be done with communicatively connected to other electronic devices by relaying the received screen data.

DESCRIPTION OF EMBODIMENTS

Hereinafter, embodiments of the present invention will be described with reference to the attached drawings. However, this is illustrative only, and the technological scope of the present invention is not limited thereto.

Outline of Screen Sharing System 1

Figure 1:
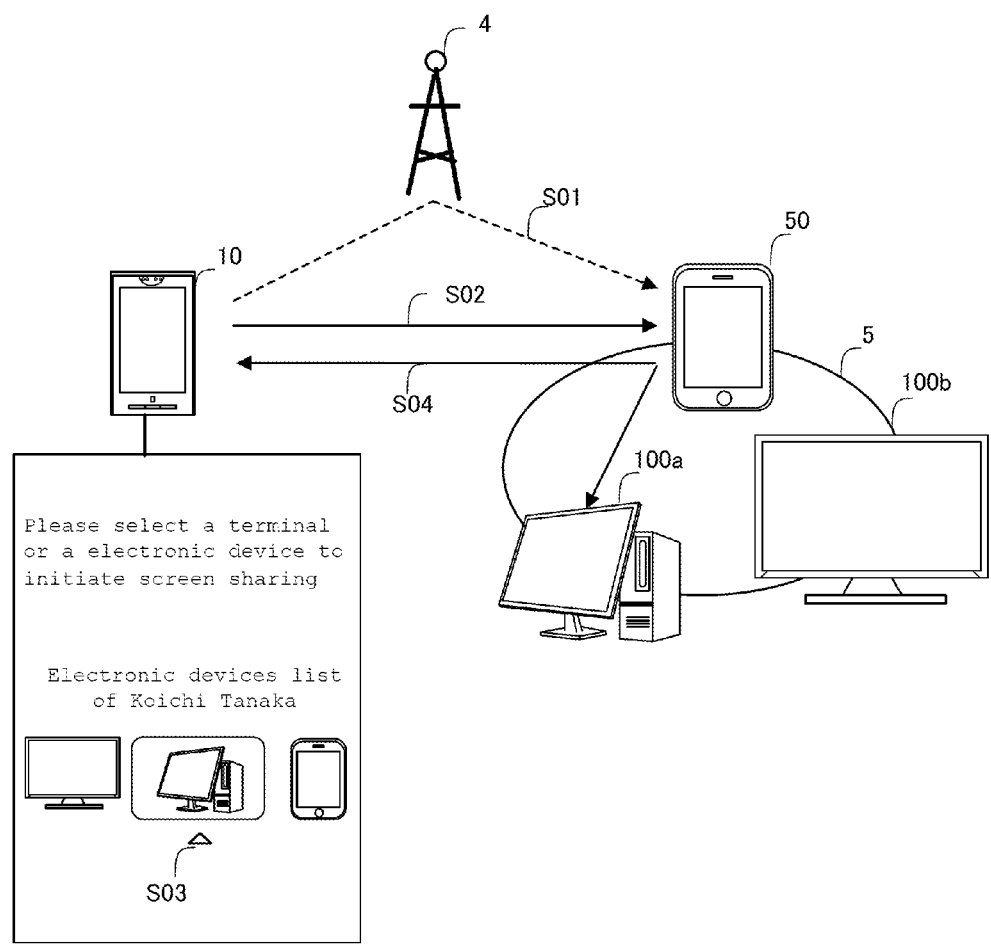
FIG. 1 shows the schematic diagram illustrating an overview of a screen sharing system 1.

FIG. 1 is a schematic diagram illustrating an overview of a screen sharing system 1. The screen sharing system 1 includes a screen sharing terminal 10, a communication terminal 50, electronic devices 100*a* and 100*b* (hereinafter simply put "an electronic device 100"), a public line network 3 (the Internet, the third and the fourth generation communication network, and the like), telephone network 4 and LAN (Local Area Network) 5.

In the beginning, the screen sharing terminal 10 make outgoing call to the communication terminal 50 for the authentication to identify the terminal that shares the screen (Step S01). Here, a method executed by the screen sharing terminal 10 for identifying and authenticating the other party terminal to share the screen is not limited to a phone call but may be a communication, etc. using public line network 3. In this example, when the communication terminal 50 receives and initiates a call, a predefined application is started and the procedure described later is initiated.

Next, the communication terminal 50 detects electronic devices 100 communicatively connected to the communication terminal 50 and acquires the list of the electronic devices. Then, the list is transmitted to the screen sharing terminal 10 (Step S02).

The screen sharing terminal 10 received the list of the electronic devices 100 accepts the selection of the terminal to share a screen from the list of the communication terminal 50 and the electronic devices 100 (Step S03). Here, for example as shown in FIG. 1, a personal computer 100*a* which is communicatively connected to the communication terminal 50 is selected as a terminal to share the screen.

Finally, the screen sharing terminal 10 initiates screen sharing with selected electronic device 100 (Step S04). The screen sharing terminal 10 may communicate directly with the personal computer 100*a* or relay the communication terminal 50 to communicate with the personal computer 100*a*. In the latter case, the screen can be shared even if the personal computer 100*a* is not connected directly with the public line network 3.

The outline of screen sharing system 1 has been fully described above.

Configuration of Screen Sharing System 1

Figure 2:
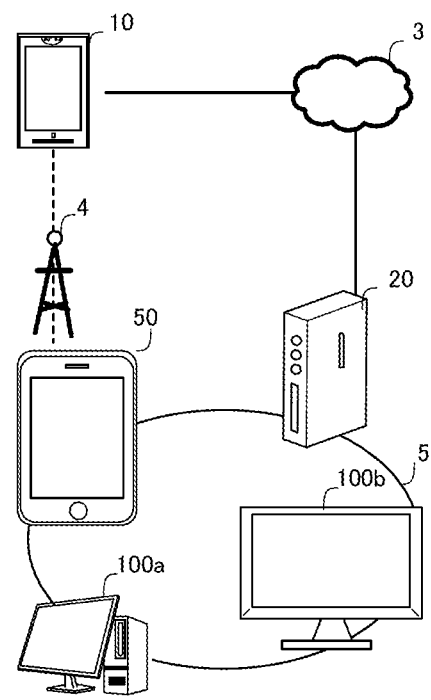
FIG. 2 shows the overall schematic diagram of a screen sharing system 1.

FIG. 2 is an overall schematic diagram of a screen sharing system 1 which is a preferable embodiment of the present invention. Here, the screen sharing terminal 10 and the communication terminal 50 provides a phone call function, and talkatively connected with each other through telephone network 4. The screen sharing terminal 10 is communicatively connected to the communication terminal 50 through the public line network 3.

The communication terminal 50 and the electronic devices 100 are communicatively connected through LAN 5. The terminals consisting of the LAN 5 are communicatively connected to the public line network 3 through a router 20. The communication in the screen sharing system 1 may be wireless or wired communication. The screen sharing terminal 10 may be communicatively connected to the public line network 3 through a network device such as a router.

The screen sharing terminal 10 is used by a user to share a screen and it may be a general information device or an electronic device that provides the functions described later in addition to the output screen such as a display and the phone call function. For example, the screen sharing terminal 10 may be a mobile phone, a smartphone, a television, and a computer. The screen sharing terminal 10 may also be general information appliances such as a telephone, a netbook terminal, a slate terminal, an electronic book terminal, an electronic dictionary terminal, a portable music player, and a portable player capable of recording and playing back contents.

The communication terminal 50 is used by a user to share a screen with the screen sharing terminal 10 and it may be a general information device or an electronic device that provides the functions described later in addition to the output screen such as a display and the phone call function in the same as the screen sharing terminal 10.

The electric device 100 is a domestic or business appliance provided with the output screen device such as a display and capable of data communication. The electric device includes information appliances such as a personal computer 100a, a television 100b, a telephone, a computer, a mobile phone, a handheld terminal, a smartphone 100c, a net book terminal, a slate terminal, an electronic book terminal, a portable music player, an audio component, a content player, a printer, a facsimile machine, a copy machine, a scanner machine, and an MFP (a multi-function peripheral device or a multi-function printer).

Functions

Figure 3:
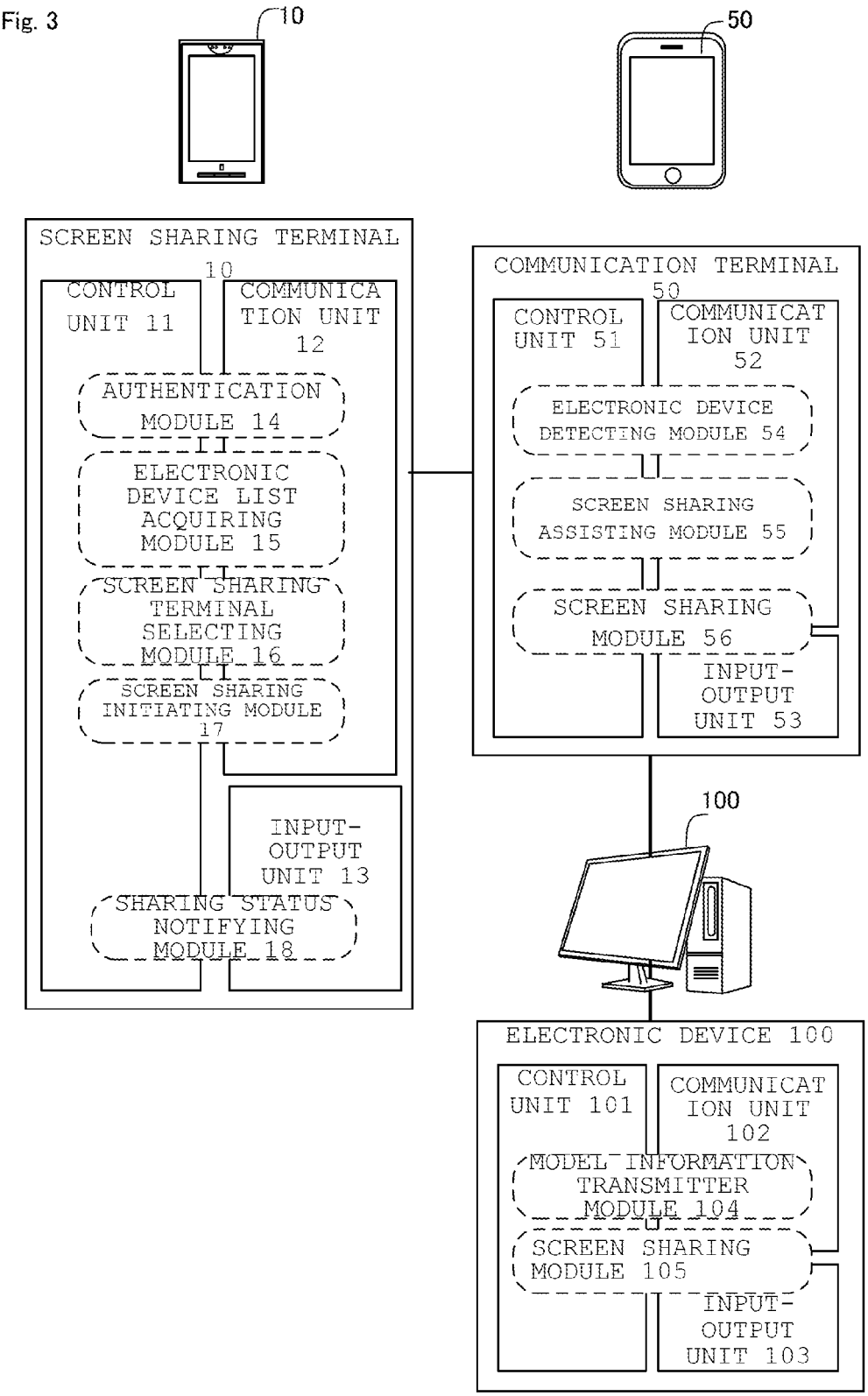
FIG. 3 shows the functional block diagram of a screen sharing terminal 10, a communication terminal 50, and an electronic device 100.

FIG. 3 shows the relations between the functional blocks and each function for the screen sharing terminal 10, the communication terminal 50, and the electronic device 100.

The screen sharing terminal 10 provides with a control unit 11 including a central processing unit (hereinafter referred to as "CPU"), a random access memory (hereinafter referred to as "RAM"), and a read only memory (hereinafter referred to as "ROM"), and the like; and a communication unit including Wireless Fidelity or Wi-Fi® enabled device complying with, for example, IEEE802.11, a wireless device complying with the IMT-2000 standard such as the third generation mobile communication system, or the like. The communication unit may be achieved through fixed LAN connection.

The screen sharing terminal 10 also provided with an input-output unit 13 including a display outputting and displaying data and images controlled by the control unit and speaker replaying voice data as an output unit; and a touch panel, a keyboard, a mouse, and the like that receive input from a user and a remote operator as an input unit.

In the screen sharing terminal 10, the control unit 11 reads a predefined program and cooperates with the communication unit 12 to run an authentication module 14, an electronic device list acquiring module 15, a screen sharing terminal selecting module 16, and a screen sharing initiating module 17. Furthermore, the control unit 11 reads a predetermined program and cooperates with the input-output unit 13 to run a sharing status notifying module 18.

In a similar way, the communication terminal 50 provides with a control unit 51 including a CPU, a RAM, a ROM, and the like; and a communication unit 52 including Wireless Fidelity or Wi-Fi® enabled device complying with, for example, IEEE802.11, a wireless device complying with the IMT-2000 standard such as the third generation mobile communication system, or the like. The communication unit may be achieved through fixed LAN connection. Moreover, the communication terminal 50 includes an input-output unit 53 including a display outputting and displaying data and images controlled by the control unit.

In the communication terminal 50, the control unit 51 reads a predefined program and cooperates with the communication unit 52 to run an electronic device detecting module 54 and a screen sharing assisting module 55. Moreover, in the electronic device 100, the control unit 51 reads a predefined program and cooperates with the communication unit 52 and the input-output unit 53 to run a screen sharing module 56.

In a similar way, the electric device 100 provides with a control unit 101 including a CPU, a RAM, a ROM, and the like; and a communication unit 102 including Wireless Fidelity or Wi-Fi® enabled device complying with, for example, IEEE802.11, a wireless device complying with the IMT-2000 standard such as the third generation mobile communication system, or the like. The communication unit may be achieved through fixed LAN connection. Moreover, the electronic device 100 includes an input-output unit 103 including a display outputting and displaying data and images controlled by the control unit.

In the electronic device 100, the control unit 101 reads a predefined program and cooperates with the communication unit 102 to run a model information transmitter module 104. The control unit 101 also reads a predefined program and cooperates with the communication unit 102 and the input-output unit 103 to run a screen sharing module 105.

Screen Sharing Process

Figure 4:
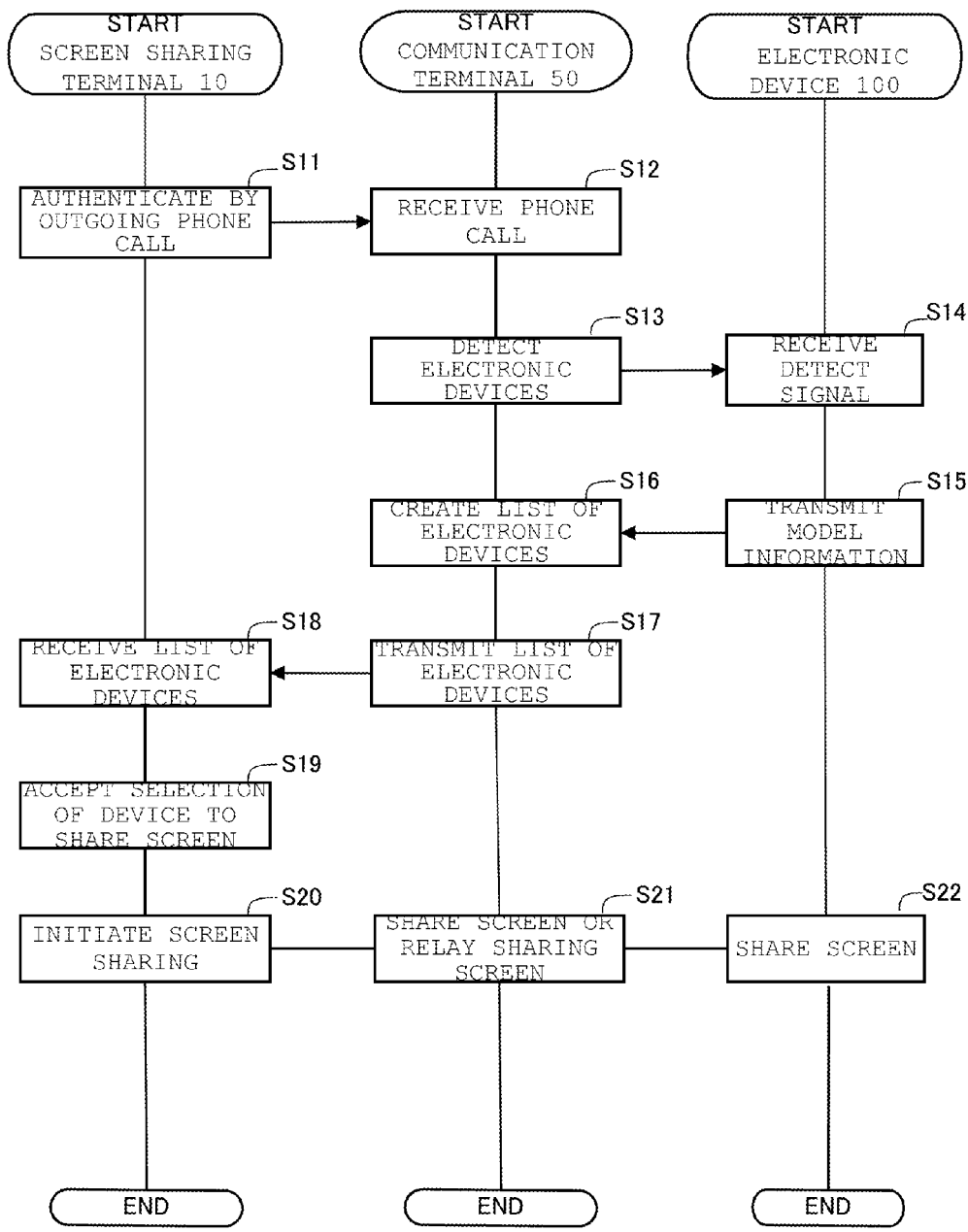
FIG. 4 shows the flowchart of the screen sharing process executed by a screen sharing terminal 10, a communication terminal 50, and an electronic device 100.

FIG. 4 is a flow chart of the screen sharing process executed by the screen sharing terminal 10, the communication terminal 50, and the electronic device 100. The process executed by the module of each of the above-mentioned devices will be explained together with the present process.

In the beginning, the authentication module 14 of the screen sharing terminal 10 makes a phone call to the communication terminal 50 to identify and authenticate the communication terminal 50 with which a screen is shared (Step S11). Here, one communication terminal 50 does not correspond to one screen sharing terminal 10, but a plurality of telephone numbers exist corresponding to the communication terminals 50 to which a phone call can be made from the screen sharing terminal 10 for identification and authentication. That is, from the viewpoint of user's behavior, just to make a phone call to a terminal with which a screen is shared.

Here, the communication for the authentication is not limited to a phone call, but the communication terminal may be authenticated by transfer/receive of the data that is electronically signed or by a communication using common key system in addition to an authentication by a communication to a predefined IP or by a password. The authentication described here is sufficient if the communication terminal 50 which the screen sharing terminal 10 communicates therewith can be identified when the screen sharing terminal 10 shares the screen.

Moreover, the screen sharing is to display the screen, which is displayed in the display unit of the screen sharing terminal 10, in the display unit of the other terminals, or to display the screen, which is displayed in the display unit of the other terminals, in the display unit of the screen sharing terminal 10.

When the communication terminal 50 receives the phone call (Step S12), a predefined application is initiated, and the communication is established between the screen sharing terminal 10 and the communication terminal 50. And, the electronic device detecting module 54 of the communication terminal 50 detects the communicatively connected electronic devices 100 (Step S13). Theoretically it is possible to detect the electronic devices which are communicatively connected through the public line network 3, but in this example of the present invention, it is appropriate to detect the electronic devices 100 which are owned by the same owner of the communication terminal 50 by detecting the electronic devices 100 connected to the same local network.

As one example of a detection of the present invention, the detection is executed by detecting the electronic device 100 by transmitting a detection signal to the device on the network. When the electronic device 100 receives the detection signal (Step S14), the model information transmitter module 104 transmits the model information such as a serial number and a manufacturer of the electronic device 100 to the communication terminal 50 (Step S15). The information, such as the presence of the display unit, related to the success and failure of the screen sharing may be included in the model information. Moreover, if the model information cannot be acquired, the existence of the electronic device 100 may be notified to the communication terminal 50 by transmitting the private IP address, etc.

The electronic device detecting module 54 of the communication terminal 50 that receives model information from the electronic devices 100 makes the list of the electronic devices 100 (Step S16). Then, the list of the electronic devices 100 is transmitted to the screen sharing terminal 10 (Step S17).

When the electronic device list acquiring module 15 of the screen sharing terminal 10 receives the list of electronic devices (Step S18), the screen sharing terminal selecting module 16 accepts the selection from the communication terminal 50 or the electronic devices 100 (Step S19).

Figure 5:
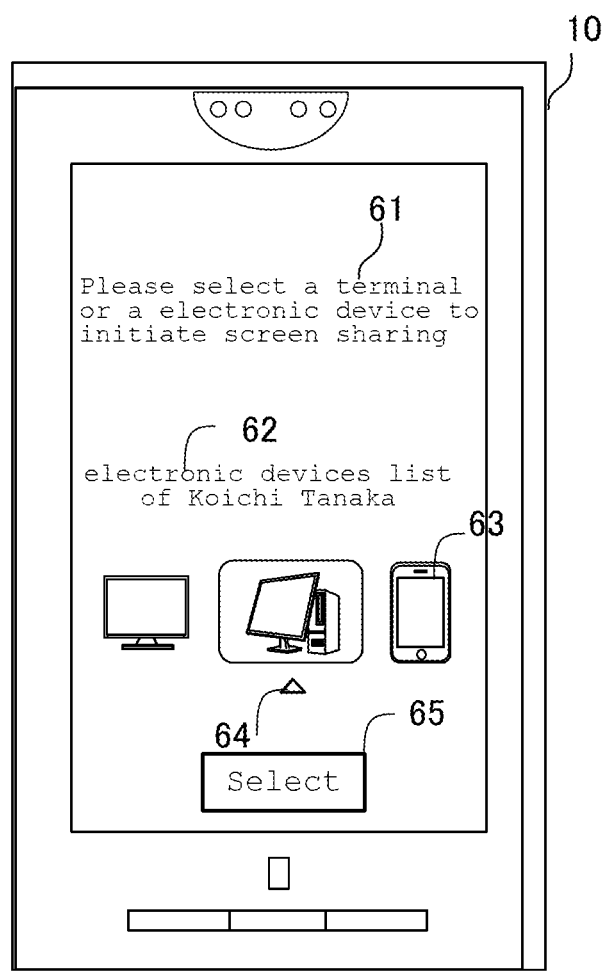
FIG. 5 shows an example image of the screen accepting the selection of a terminal to share the screen.

FIG. 5 is an example image of the screen accepting the selection of a terminal to share the screen. With a message 61 to show that the terminal is accepting the selection and a username 62 of the owner of the communication terminal 50, a list 63 of the communication terminal 50 and the electronic devices 100 is displayed. A user selects a terminal to share the screen by setting a cursor 64 to the terminal to share the screen and pressing down on a select button 65.

Figure 6:
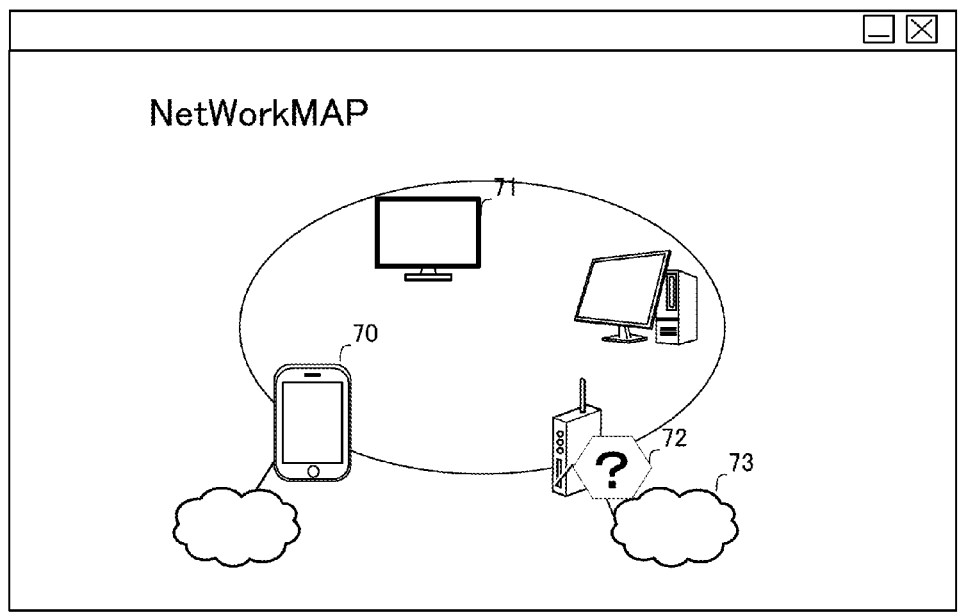
FIG. 6 shows an example image of the screen accepting the selection of a terminal to share the screen displayed as a network map.

FIG. 6 is an example image of the screen accepting the selection of a terminal to share the screen displayed as a network map. Based on model information transmitted by the communication terminal 50 and the electronic devices 100, icons 70 and 71 are displayed, and the terminal may be selected from the network map. Moreover, by using the information on the presence of the display unit included in the model information, information such as a status icon 72 can be displayed in the terminal in case it is unknown whether or not the screen can be shared with. Moreover, a cloud type icon 73 shows that the terminal is communicatively connected to the public line network 3.

When a terminal to share the screen is selected, the screen sharing initiating module 17 of the screen sharing terminal 10 initiates the screen sharing with the selected terminal (Step S20). Specifically, the screen data which is expanded in a buffer and displayed in the display unit is transmitted to the communication terminal 50 with the information on the terminal to be shared a screen.

If the communication terminal 50 is selected as a terminal to share the screen, the screen sharing module 56 of the communication terminal 50 displays the received screen data in the display unit of the communication terminal 50 to share the screen (Step S21). Moreover, if not the communication terminal 50 but the electronic device 100 is selected, the screen sharing assisting module 55 relays and transmits the screen data to the selected electronic device 100. The screen sharing module 105 of the electronic device 100 receiving the screen data displays the screen data in the display unit to share the screen (Step S22).

For sharing screen, the screen data of screen sharing terminal 10 needs not to be transmitted, and the screen sharing terminal 10 may receive the screen data from the other terminals. In such a case, the communication terminal 50 relays and transmits the screen data received from the electronic device 100 to the screen sharing terminal 10.

Figure 7:
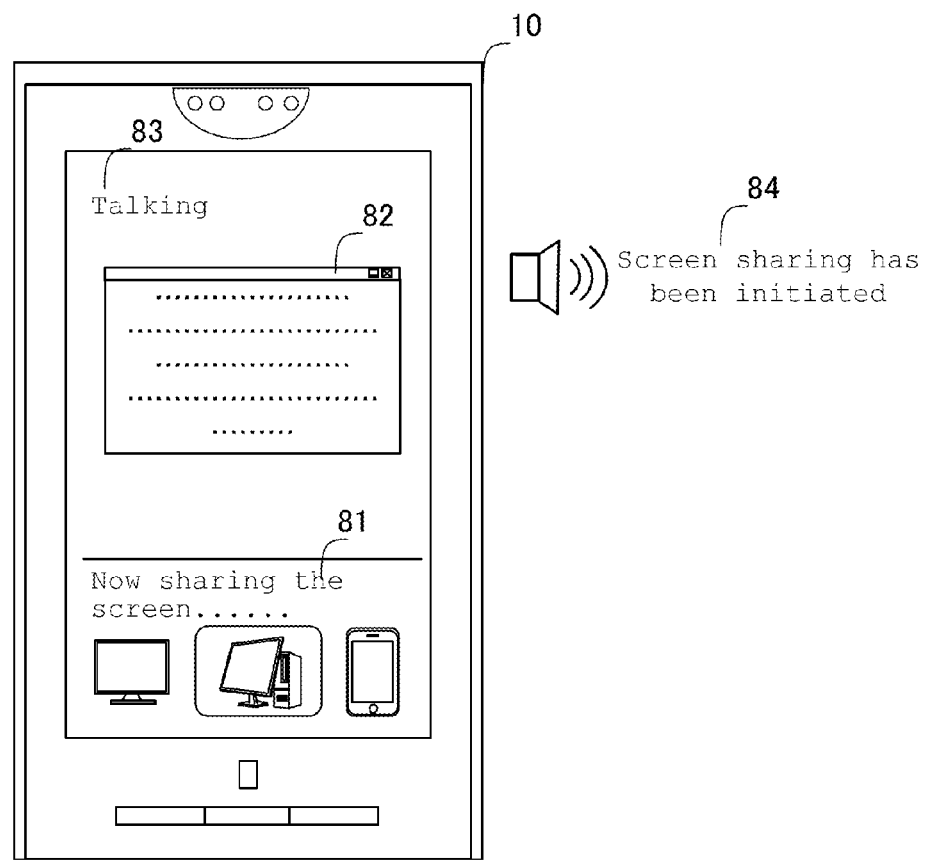
FIG. 7 shows an example image of the screen sharing terminal 10 while the screen is shared.

FIG. 7 shows an example image of the screen sharing terminal 10 while the screen is shared. A message 81 denoting that the screen is now shared and a shared screen data 82 are shown. Moreover, when the first authentication is executed by the phone call, if the screen sharing terminal 10 is currently used for calling, this is shown by a status 83. In addition, as the display unit is now sharing the screen, especially when it is not desirable to display the system message related to the sharing status in the screen or when the display cannot be continuously monitored in a case such as while talking over the phone, the sharing status notifying module 18 of the screen sharing terminal 10 may notify a sharing status 84 by voice through the speaker etc.

The screen sharing process has been fully described above.

To achieve the functionality as described above, a computer (including a CPU, an information processing unit, or various terminals) reads and executes a predetermined program. For example, a program is provided in forms recorded in a computer-readable record medium such as a flexible disk, a CD (CD-ROM etc.), and a DVD (a DVD-ROM and a DVD-RAM, etc.). In this case, a computer reads a program from the storage medium, forwards the program to an internal or external memory device to store the program in such a memory device, and executes the program. For example, the application program may be preliminarily recorded in memory (a record media) such as a magnetic disk, an optical disk, and a magnetic optical disk, and then provided from memory to a computer through a communication line.

The embodiments of the present invention are described above, but the present invention is not limited thereto. The effects described in the embodiments of the present invention are merely listed as the most suitable effects produced from the present invention. The effects of the present invention are not limited to those described in the embodiments of the present invention.

REFERENCE SIGNS LIST

1 screen sharing system
3 public line network
4 telephone network
10 screen sharing terminal
50 communication terminal
100 electronic device

The invention claimed is:
1. A screen sharing terminal communicatively connected to a communications terminal, comprising:
an authentication unit that authenticates the communications terminal to establish communications therewith such that a screen of the screen sharing terminal may be shared with one or more electronic devices connected with the communications terminal via a LAN;
an electronic device list acquiring unit that acquires and generates a list of the one or more electronic devices communicatively connected to the communications terminal via the LAN;
a screen sharing terminal selecting unit that accepts a selection of the one or more electronic devices connected to the communications terminal via the LAN and indicated on the acquired list such that a screen of the screen sharing terminal is shareable with one or more of the electronic devices upon selection thereof; and a screen sharing initiating unit that initiates screen sharing with the one or more electronic devices connected to the communications terminal via the LAN and accepted via the screen sharing terminal selecting unit.

2. The screen sharing terminal according to claim 1, further comprising a sharing status notifying unit notifying a screen sharing status of the screen to be shared via a voice output.

3. The screen sharing terminal according to claim 2, wherein the authentication unit authenticates the communications terminal by an outgoing phone call; and the screen sharing initiating unit transmitting a screen of the screen sharing terminal to the communications terminal or the one or more electronic devices.

4. The screen sharing terminal according to claim 1, wherein the authentication unit authenticates the communications terminal by an outgoing phone call; and the screen sharing initiating unit transmitting a screen of the screen sharing terminal to the communications terminal or the one or more electronic devices.

5. A method of sharing a screen between a screen sharing terminal and one or more electronic devices communicatively connected to a communications device via a LAN, the method comprising: authenticating the communications terminal to establish communications between the screen sharing terminal and the communications terminal such that a screen of the screen sharing terminal may be shared with the one or more electronic devices connected with the communications terminal via the LAN; acquiring and generating a list of the one or more electronic devices communicatively connected to the communications terminal via the LAN; accepting a selection of the one or more electronic devices connected to the communications terminal via the LAN and indicated on the acquired list such that a screen of the screen sharing terminal is shareable with the one or more electronic devices upon selection thereof; and initiating screen sharing between the screen sharing terminal and the one or more electronic devices connected to the communications terminal via the LAN and accepted via the screen sharing terminal.

6. A non-transitory computer readable medium including computer readable code, which when executed by a screen sharing terminal communicatively connected to a communications terminal, causes the screen sharing terminal to:

authenticate the communications terminal to establish communications therewith such that a screen of the screen sharing terminal may be shared with one or more electronic devices connected with the communications terminal via a LAN;

acquire and generate a list of the one or more electronic devices communicatively connected to the communications terminal via the LAN;

accept a selection of the one or more electronic devices connected to the communications terminal via the LAN and indicated on the acquired list such that a screen of the screen sharing terminal is shareable with one or more of the electronic devices upon selection thereof; and initiate screen sharing with the one or more electronic devices connected to the communications terminal via the LAN and accepted via the screen sharing terminal.

* * * * *